(12) United States Patent
Iddles et al.

(10) Patent No.: US 7,326,667 B2
(45) Date of Patent: Feb. 5, 2008

(54) MICROWAVE DIELECTRIC CERAMIC

(75) Inventors: David Martin Iddles, Shrewsbury (GB); Duncan Muir, Sandbach (GB); Timothy James Price, Market Drayton (GB)

(73) Assignee: Remec International Holdings SRL, Warrens, St. Michael (BB)

( * ) Notice: Subject to any disclaimer, the term of this patent is extended or adjusted under 35 U.S.C. 154(b) by 154 days.

(21) Appl. No.: 11/354,220

(22) Filed: Feb. 13, 2006

(65) Prior Publication Data

US 2007/0035216 A1 Feb. 15, 2007

(30) Foreign Application Priority Data

Aug. 10, 2005 (GB) ................... 0516421.5
Sep. 14, 2005 (GB) ................... 0518736.4
Sep. 29, 2005 (GB) ................... 0519804.9

(51) Int. Cl.
*C04B 35/465* (2006.01)

(52) U.S. Cl. ..................... 501/136; 333/219.1
(58) Field of Classification Search ............... 501/136; 333/219.1
See application file for complete search history.

(56) References Cited

U.S. PATENT DOCUMENTS

| 5,356,844 | A  | * | 10/1994 | Hirahara et al. ............ 501/136 |
| 6,025,291 | A  | * | 2/2000  | Murakawa ................... 501/136 |
| 6,143,680 | A  | * | 11/2000 | Okawa ........................ 501/136 |
| 6,503,861 | B1 | * | 1/2003  | Murakawa et al. .......... 501/137 |
| 6,613,707 | B2 | * | 9/2003  | Choi et al. ................... 501/136 |
| 6,645,896 | B2 |   | 11/2003 | Okamoto et al. |
| 6,734,126 | B2 | * | 5/2004  | Ohtsuki et al. ............. 501/136 |
| 6,940,371 | B2 | * | 9/2005  | Kono et al. ................ 333/219.1 |

FOREIGN PATENT DOCUMENTS

| EP | 1 588 991 A1 | 10/2005 |
| GB | 2 413 127 A  | 10/2005 |
| JP | 2003-238242  | 8/2003  |
| JP | 2004-182534  | 7/2004  |
| WO | WO 01/27942 A1 | 4/2001 |

OTHER PUBLICATIONS

Search Report dated Dec. 7, 2005 from related Great Britain Application No. GB0518736.4.
Search Report dated Jun. 22, 2006 from related Great Briain Application No. GB0601381.7.

* cited by examiner

*Primary Examiner*—Karl E Group
(74) *Attorney, Agent, or Firm*—Myers Dawes Andras & Sherman LLP

(57) ABSTRACT

A dielectric ceramic material consisting essentially of a composition of Formula 1

$$xATiO_3(1-x)Nd_zRe_{(1-z)}AlO_3 \qquad (1)$$

doped with 0.005% to 5% of a dopant selected from the group consisting of: cerium oxide, manganese oxide and mixtures thereof;
wherein A may be selected from the group consisting of: Ca, Sr, Mg and mixtures thereof;
Re may be selected from a group consisting of La, Sm, Pr, Dy, Er, Gd, Y and mixtures thereof;
wherein z is from 0.95 to 0.995; and
wherein x is a positive number less than 1.

20 Claims, No Drawings

MICROWAVE DIELECTRIC CERAMIC

This application claims priority under 35 U.S.C. §119 to the following United Kingdom patent applications: No. 0516421.5, filed Aug. 10, 2005; No. 0518736.4, filed Sep. 14, 2005; and No. 0519804.9, filed Sep. 29, 2005.

This invention relates to a dielectric ceramic material and also to a dielectric resonator comprising the novel ceramic material, the resonator being particularly useful for microwave application.

According to the present invention there is provided a dielectric ceramic material consisting essentially of a composition of Formula 1:

$$xATiO_3 + (1-x)Nd_zRe_{(1-z)}AlO_3 \quad (1)$$

doped with about 0.005 wt % to about 5 wt % of a dopant selected from the group consisting of: cerium oxide, manganese oxide and mixtures thereof;

wherein A may be selected from the group consisting of: Ca, Sr, Mg and mixtures thereof;

Re may be selected from a group consisting of La, Sm, Pr, Dy, Gd, Y, Er and mixtures thereof;

wherein z is from 0.95 to 0.995; and wherein x is a positive number less than 1.

Materials in accordance with this invention find application in microwave base station filters (single and multimode). Preferred materials may be prepared which allow changes to relative permittivity $\epsilon_r$ and TCf values while retaining Q values>10,000 at about 2 GHz suitable for their intended applications.

Preferred materials in accordance with this invention possess high relative permittivity $\epsilon_r$ values in comparison to known materials with equivalent Q values. Particularly preferred materials have $\epsilon_r$ of 42-50, Q>10,000, for example>14,000, at about 2 GHz (e.g., 2.7 GHz) and TCf between −10 to +10 MK$^{-1}$.

Materials in accordance with this invention possess further advantages in relation to materials disclosed in the prior art, for example U.S. Pat. No. 5,356,844, because the ceramics of this invention have an improved microwave quality factor at ambient and higher operating temperatures.

Preferred materials consist essentially of a composition of Formula 2:

$$xCa_dSr_{(1-d)}TiO_3 + (1-x)Nd_zRe_{(1-z)}AlO_3 \quad (2)$$

doped with about 0.005% to about 5% of a dopant selected from the group consisting of: cerium oxide, manganese oxide and mixtures thereof;

wherein $0.5 \leq x \leq 0.9$ $0.25 \leq d \leq 1.0$ $0.95 \leq z \leq 0.995$ $1 \leq y \leq 2$ Re may be selected from a group consisting of La, Sm, Pr, Dy and mixtures thereof and wherein CeO$_2$ is added as a dopant in the range about 50 ppm to about 2.5 wt %.

MnO$_y$ is added as a dopant in the range about 50 ppm to about 2.5 wt %.

Further preferred materials consist essentially of a composition of Formula 3:

$$xCaTi_{1.03}O_3 + (1-x)Nd_{0.95}Re_{0.05}AlO_3 \quad (3)$$

wherein $0.65 \leq x \leq 0.72$; y and Re are as stated above and wherein

CeO$_2$ is added as a dopant in the range about 50 ppm to about 2.0 wt %.

MnO$_y$ is added as a dopant in the range about 50 ppm to about 1.0 wt %.

In preferred materials the ratio of Nd:Re is about 19:1.

An additional dopant selected from Fe$_2$O$_3$, Nb$_2$O$_5$, Ta$_2$O$_5$, Ga$_2$O$_3$ and mixtures thereof preferably Ga$_2$O$_3$ may be present in an amount of about 20 to about 5000 ppm, more preferably about 20 to about 2000 ppm.

The manganese oxide may be provided as the oxide or mixture of oxides or as a carbonate, oxalate or other thermally labile derivative.

The Ca, Nd, Al, Ti site occupancies may all be varied by +/−10%. In this specification MnO$_y$ refers to the material after firing. Most Mn salts may be used to achieve the final MnO$_y$.

The electrical properties for these ceramics can be summarised as follows:

$\epsilon_r$ 42–48

Q (2 GHz)>10,000

TCf (variable through composition)−10 to +10 MK$^{-1}$.

Compositions of the present invention may be manufactured by mixing the appropriate oxides, carbonates or oxalates or mixtures thereof in the above mentioned proportions, pulverising the mixture using a wet or dry method, calcining the mixture at a temperature of 1100° C. to 1400° C. for 1 to 16 hours, shaping the calcined mixture into an optional form and sintering the shaped body at a temperature of 1400° C. to 1700° C.

Percentages and other amounts referred to in this specification are by weight unless indicated otherwise.

The invention is further described by means of example but not in any limitative sense:

Experimental Procedure

All initial starting powders were of purity>99%. The raw materials were weighed in the appropriate quantities to form the compositions required. Deionised water or propan-2-ol was added to the weighed batches which were subsequently ball milled with magnesia stabilised zirconia milling media for 16 hours. Alternatively, the materials were attrition milled for 2 hours with yttria stabilised zirconia media. Subsequently, the raw material batches were dried at 80° C. and sieved through a 250 μm nylon mesh. The dried powder was calcined at temperatures in the interval 1100° C. to 1400° C. for 1 to 16 hours. The as-calcined powders were re-milled with 2 wt % PEG binder (MW 10000) for 8 hours, dried and sieved. Standard test samples of 9 g weight were uniaxially pressed in a 20 mm hardened stainless steel die using a pressure of~150 MPa. Sintering of the pellets was performed between 1350 and 1600° C. for 1 to 48 hours under either an air or oxygen atmosphere. All samples were of density>95% theoretical density using the Archimedes water immersion technique.

The electrical properties were tested on the sintered components. Microwave dielectric properties were measured in reflection using the TE016 mode in a cubic silver plated cavity. TCf measurements were made in the interval +80° C. to −20° C. with the values of 60, 20 and −10° C. being used to calculate TCf. Er measurements were made using the parallel plate transmission technique of Hakki and Coleman.

EXAMPLE 1

Data mixtures of CaTiO$_3$ (CT) and Nd$_{0.95}$Sm$_{0.05}$AlO$_3$ (NSA); i.e a ratio of Nd to Sm of 19:1—aiming for a TCf between +6 and −6 MK$^{-1}$ were as shown in Table 1.

TABLE 1

| Material | Density/g cm$^{-3}$ | f/GHz | $\epsilon_r$ | Q | Qf/GHz | TCf/MK$^{-1}$ |
|---|---|---|---|---|---|---|
| 0.700 CT + 0.300 NSA | 4.79 | 2.67 | 46.8 | 15300 | 40700 | 5.6 |
| 0.695 CT + 0.305 NSA | 4.78 | 2.69 | 46.0 | 15300 | 41000 | 3.3 |
| 0.690 CT + 0.310 NSA | 4.81 | 2.70 | 46.7 | 15300 | 41200 | 0.8 |
| 0.685 CT + 0.315 NSA | 4.80 | 2.72 | 44.9 | 15300 | 41400 | -1.5 |
| 0.680 CT + 0.320 NSA | 4.83 | 2.74 | 45.3 | 15100 | 41400 | -4.0 |

EXAMPLE 2

Variation in electrical properties as a function of Nd to auxiliary rare earth ratio: Properties of undoped CTNReA (0.700 CaTi$_{1.03}$O$_3$+0.300 Nd$_{0.9}$Re$_{0.1}$AlO$_3$) ceramics where the ratio of Nd to Re is equal to 9:1 are shown in Table 2.

TABLE 2

| Material | Density/ g cm$^{-3}$ | f/GHz | $\epsilon_r$ | Q | Qf/GHz | TCf/MK$^{-1}$ |
|---|---|---|---|---|---|---|
| 100% Nd$_2$O$_3$ | 4.77 | 2.67 | 46.6 | 15500 | 41400 | 6.0 |
| Substitution of alternative rare earth for Nd in a ratio 10:1 ||||||| 
| CeO$_2$ | 4.76 | 2.65 | 46.9 | 14700 | 39000 | 7.9 |
| Sm$_2$O$_3$ | 4.77 | 2.68 | 46.6 | 15600 | 41600 | 6.1 |
| Pr$_6$O$_{11}$ | 4.76 | 2.66 | 47.0 | 15500 | 41200 | 8.3 |
| Dy$_2$O$_3$ | 4.78 | 2.68 | 46.4 | 14000 | 37400 | 6.8 |
| Y$_2$O$_3$ | 4.71 | 2.68 | 46.2 | 14100 | 37700 | 5.3 |

EXAMPLE 3

Properties of undoped CTNReA (0.700 CaTi$_{1.03}$O$_3$+0.300 Nd$_{0.95}$Re$_{0.05}$AlO$_3$) ceramics where the ratio of Nd to Re is equal to 19:1 are shown in Table 3.

TABLE 3

| Material | Density/ g cm$^{-3}$ | f/GHz | $\epsilon_r$ | Q | Qf/GHz | TCf/MK$^{-1}$ |
|---|---|---|---|---|---|---|
| 100% Nd$_2$O$_3$ | 4.77 | 2.67 | 46.6 | 15500 | 41400 | 6.0 |
| Substitution of alternative rare earth for Nd in a ratio 19:1 |||||||
| La$_2$O$_3$ | 4.74 | 2.66 | 46.9 | 15300 | 40700 | 6.6 |
| Sm$_2$O$_3$ | 4.75 | 2.67 | 46.6 | 15300 | 40600 | 6.1 |
| Pr$_6$O$_{11}$ | 4.75 | 2.66 | 46.9 | 15300 | 40700 | 6.9 |

EXAMPLE 4

Properties of doped CTNReA (0.690 CaTi$_{1.03}$O$_3$+0.310 [Nd,Sm]AlO$_3$+0.5 wt % CeO$_2$) ceramics where the ratio of Nd to Sm is greater than 19:1 are shown in Table 4.

TABLE 4

| Nd:Sm | Density/g cm$^{-3}$ | f/GHz | $\epsilon_r$ | Q | Qf/GHz | TCf/MK$^{-1}$ |
|---|---|---|---|---|---|---|
| 99:1 | 4.80 | 2.70 | 45.3 | 15800 | 42600 | -0.6 |
| 49:1 | 4.79 | 2.71 | 45.4 | 15800 | 42800 | -0.6 |
| 32:1 | 4.80 | 2.70 | 45.4 | 15700 | 42400 | -0.2 |
| 24:1 | 4.80 | 2.71 | 45.3 | 15900 | 43000 | -1.0 |
| 19:1 | 4.80 | 2.73 | 45.4 | 15500 | 42100 | -0.5 |

EXAMPLE 5

Properties of undoped CTNReA (0.700 CaTi$_{1.03}$O$_3$+0.300 Nd$_{0.05}$Re$_{0.95}$AlO$_3$) ceramics where the ratio of Nd to Re is equal to 1:19 are shown in Table 5.

TABLE 5

| Material | Density/ g cm$^{-3}$ | f/GHz | $\epsilon_r$ | Q | Qf/GHz | TCf/MK$^{-1}$ |
|---|---|---|---|---|---|---|
| 100% Nd$_2$O$_3$ | 4.77 | 2.67 | 46.6 | 15500 | 41400 | 6.0 |
| Substitution of alternative rare earth for Nd in a ratio 1:19 |||||||
| La$_2$O$_3$ | 4.65 | 2.57 | 49.9 | 14000 | 35850 | 22.0 |
| Sm$_2$O$_3$ | 4.81 | 2.69 | 45.7 | 15200 | 40900 | 7.9 |
| Pr$_6$O$_{11}$ | 4.68 | 2.60 | 48.8 | 14300 | 37200 | 24.9 |

EXAMPLE 6

Properties of undoped CTNPrA (0.660 CaTi$_{1.03}$O$_3$+0.340 [Nd,Pr]AlO$_3$) ceramics where the ratio of Nd to Pr is varied for zero TCf are shown in Table 6.

TABLE 6

| Nd:Pr | Density/g cm$^{-3}$ | f/GHz | $\epsilon_r$ | Q | Qf/GHz | TCf/MK$^{-1}$ |
|---|---|---|---|---|---|---|
| 1:19.0 | 4.84 | 2.76 | 44.0 | 14500 | 39800 | 1.1 |
| 1:18.0 | 4.80 | 2.73 | 44.8 | 14100 | 38500 | 6.6 |
| 1:17.0 | 4.76 | 2.70 | 45.7 | 13900 | 37400 | 13.0 |
| 1:16.0 | 4.72 | 2.66 | 46.8 | 13400 | 35700 | 20.0 |
| 1:15.5 | 4.70 | 2.65 | 47.5 | 12900 | 34200 | 25.5 |

EXAMPLE 7

Single doping of zero TCf material where Nd:Sm is 19:1. Base material: 0.690 CaTi$_{1.03}$O$_3$+0.310 Nd$_{0.95}$Sm$_{0.05}$AlO$_3$
The data for MnO$_2$ doping are shown in Table 7(a)

TABLE 7(a)

| wt % MnO$_2$ | Density/ g cm$^{-3}$ | f/GHz | $\epsilon_r$ | Q | Qf/GHz | TCf/MK$^{-1}$ |
|---|---|---|---|---|---|---|
| 0.000 | 4.79 | 2.70 | 45.7 | 15300 | 41200 | 0.8 |
| 0.005 | 4.78 | 2.71 | 45.7 | 15300 | 41500 | 1.0 |
| 0.010 | 4.78 | 2.70 | 45.7 | 15400 | 41500 | 0.9 |
| 0.050 | 4.78 | 2.70 | 45.7 | 15000 | 40400 | 0.9 |
| 0.100 | 4.78 | 2.70 | 45.7 | 15000 | 40400 | 1.0 |
| 0.250 | 4.78 | 2.70 | 45.7 | 14200 | 38400 | 0.9 |

The data for CeO$_2$ doping are shown in Table 7(b)

TABLE 7(b)

| wt % CeO$_2$ | Density/g cm$^{-3}$ | f/GHz | $\epsilon_r$ | Q | Qf/GHz | TCf/MK$^{-1}$ |
|---|---|---|---|---|---|---|
| 0.000 | 4.79 | 2.70 | 45.7 | 15300 | 41200 | 0.8 |
| 0.005 | 4.79 | 2.70 | 45.7 | 15600 | 42200 | 0.8 |
| 0.010 | 4.80 | 2.71 | 45.4 | 15600 | 42200 | 0.8 |
| 0.050 | 4.81 | 2.70 | 45.5 | 15700 | 42400 | 0.7 |
| 0.100 | 4.80 | 2.71 | 45.4 | 15600 | 42400 | 0.4 |
| 0.200 | 4.79 | 2.70 | 45.3 | 15700 | 42400 | 0.1 |
| 0.500 | 4.81 | 2.71 | 45.2 | 15700 | 42500 | −0.7 |

The data for Co-doping with CeO$_2$ & MnO$_2$ are shown in Table 7(c)

TABLE 7(c)

| wt % CeO$_2$ & % MnO$_2$ | Density/g cm$^{-3}$ | f/GHz | $\epsilon_r$ | Q | Qf/GHz | TCf/MK$^{-1}$ |
|---|---|---|---|---|---|---|
| 0.00 & 0.00 | 4.79 | 2.70 | 45.7 | 15300 | 41200 | 0.8 |
| 0.01 & 0.01 | 4.78 | 2.70 | 45.5 | 15300 | 41200 | 0.8 |
| 0.03 & 0.03 | 4.78 | 2.70 | 45.5 | 15200 | 41100 | 0.8 |
| 0.05 & 0.05 | 4.78 | 2.70 | 45.6 | 15200 | 40900 | 0.8 |
| 0.01 & 0.05 | 4.78 | 2.69 | 45.5 | 15300 | 41300 | 0.8 |
| 0.05 & 0.01 | 4.78 | 2.70 | 45.6 | 15100 | 40700 | 1.0 |

EXAMPLE 8

Single doping of zero TCf material where Nd:Sm or Nd:Pr is 1:19.

Base material: 0.690 CaTi$_{1.03}$O$_3$+0.310 Nc$_{0.05}$Sm$_{0.95}$AlO$_3$

TABLE 8(a)

| wt % CeO$_2$ | Density/g cm$^{-3}$ | f/GHz | $\epsilon_r$ | Q | Qf/GHz | TCf/MK$^{-1}$ |
|---|---|---|---|---|---|---|
| 0.0 | 4.86 | 2.73 | 44.6 | 15400 | 42100 | 2.8 |
| 0.1 | 4.86 | 2.74 | 44.6 | 15300 | 41700 | 2.8 |
| 0.2 | 4.85 | 2.74 | 44.4 | 15400 | 42100 | 2.3 |
| 0.5 | 4.86 | 2.75 | 44.3 | 15500 | 42400 | 1.5 |

Base material: 0.660 CaTi$_{1.03}$O$_3$+0.340 Nd$_{0.05}$Pr$_{0.95}$AlO$_3$

TABLE 8(b)

| wt % CeO$_2$ | Density/g cm$^{-3}$ | f/GHz | $\epsilon_r$ | Q | Qf/GHz | TCf/MK$^{-1}$ |
|---|---|---|---|---|---|---|
| 0.0 | 4.84 | 2.76 | 44.0 | 14500 | 39800 | 1.1 |
| 0.1 | 4.82 | 2.76 | 43.9 | 14400 | 39800 | 0.6 |
| 0.5 | 4.83 | 2.76 | 43.7 | 14500 | 40000 | 0.7 |

EXAMPLE 9

Additional doping trials:

(a) Fe$_2$O$_3$

Fe$_2$O$_3$ was added as an excess to the composition 0.690 CaTi$_{1.03}$O$_3$+0.310 Nd$_{0.95}$Sm$_{0.05}$AlO$_3$.

TABLE 9(a)

| wt % Fe$_2$O$_3$ | Density/g cm$^{-3}$ | f/GHz | $\epsilon_r$ | Q | Qf/GHz | TCf/MK$^{-1}$ |
|---|---|---|---|---|---|---|
| 0.000 | 4.79 | 2.70 | 45.7 | 15300 | 41200 | 0.8 |
| 0.005 | 4.77 | 2.69 | 45.7 | 15500 | 41700 | 1.2 |
| 0.010 | 4.77 | 2.69 | 45.7 | 15500 | 41700 | 1.3 |
| 0.050 | 4.77 | 2.69 | 45.7 | 15300 | 41100 | 1.5 |
| 0.100 | 4.78 | 2.69 | 45.7 | 15100 | 40500 | 1.6 |
| 0.500 | 4.77 | 2.69 | 45.8 | 13400 | 36200 | 2.3 |

(b) SrO

SrO was added as a substitution for Ca in the composition 0.690 (Ca,Sr)Ti$_{1.03}$O$_3$+0.310 Nd$_{0.95}$Sm$_{0.05}$AlO$_3$+0.2 wt % excess CeO$_2$.

TABLE 9(b)

| mol % SrO | Density/g cm$^{-3}$ | f/GHz | $\epsilon_r$ | Q | Qf/GHz |
|---|---|---|---|---|---|
| 0.0 | 4.79 | 2.70 | 45.7 | 15300 | 41200 |
| 1.0 | 4.77 | 2.69 | 45.9 | 14900 | 40200 |
| 2.0 | 4.79 | 2.69 | 45.9 | 15100 | 40500 |
| 5.0 | 4.82 | 2.70 | 46.1 | 14500 | 39200 |
| 10.0 | 4.86 | 2.68 | 46.7 | 14100 | 37800 |
| 20.0 | 4.93 | 2.67 | 47.6 | 12700 | 34000 |

(c) Nb$_2$O$_5$

Nb$_2$O$_5$ was added an excess to the composition 0.690 CaTi$_{1.03}$O$_3$+0.310 Nd$_{0.95}$Sm$_{0.05}$AlO$_3$ +0.2 wt % excess CeO$_2$.

TABLE 9(c)

| wt % Nb$_2$O$_5$ | Density/g cm$^{-3}$ | f/GHz | $\epsilon_r$ | Q | Qf/GHz | TCf/MK$^{-1}$ |
|---|---|---|---|---|---|---|
| 0.0 | 4.79 | 2.70 | 45.7 | 15300 | 41200 | 0.8 |
| 0.1 | 4.77 | 2.70 | 45.7 | 15600 | 42100 | 1.2 |
| 0.2 | 4.77 | 2.70 | 45.7 | 15600 | 42000 | 1.3 |
| 0.5 | 4.77 | 2.70 | 45.9 | 15300 | 41200 | 1.5 |

(d) Ta$_2$O$_5$

Ta$_2$O$_5$ was added an excess to the composition 0.690 CaTi$_{1.03}$O$_3$+0.310 Nd$_{0.95}$Sm$_{0.05}$AlO$_3$ +0.2 wt % excess CeO$_2$.

TABLE 9(d)

| wt % Ta$_2$O$_5$ | Density/g cm$^{-3}$ | f/GHz | $\epsilon_r$ | Q | Qf/GHz | TCf/MK$^{-1}$ |
|---|---|---|---|---|---|---|
| 0.0 | 4.79 | 2.70 | 45.7 | 15300 | 41200 | 0.8 |
| 0.1 | 4.78 | 2.71 | 45.6 | 15600 | 42300 | 1.0 |
| 0.2 | 4.78 | 2.69 | 45.7 | 15600 | 41900 | 1.2 |
| 0.5 | 4.78 | 2.70 | 45.7 | 15700 | 42500 | 1.1 |

(e) Ga$_2$O$_3$

Ga$_2$O$_3$ was added as both an excess and a substitute for Ti in the composition 0.690 CaTi$_{1.03}$O$_3$+0.310 Nc$_{0.95}$Sm$_{0.05}$AlO$_3$+0.2 wt % excess CeO$_2$.

TABLE 9(e)

| % Ga$_2$O$_3$ | Density/g cm$^{-3}$ | f/GHz | $\epsilon_r$ | Q | Qf/GHz | TCf/MK$^{-1}$ |
|---|---|---|---|---|---|---|
| 0.000 | 4.79 | 2.70 | 45.7 | 15300 | 41200 | 0.8 |
| 0.005 on Ti site | 4.77 | 2.70 | 45.4 | 16100 | 43500 | −0.1 |

TABLE 9(e)-continued

| % $Ga_2O_3$ | Density/ g cm$^{-3}$ | f/GHz | $\epsilon_r$ | Q | Qf/GHz | TCf/ MK$^{-1}$ |
|---|---|---|---|---|---|---|
| 0.010 on Ti site | 4.77 | 2.70 | 45.1 | 16200 | 43800 | −0.8 |
| 0.100 wt % excess | 4.77 | 2.70 | 45.6 | 15900 | 42700 | 1.0 |
| 0.200 wt % excess | 4.77 | 2.69 | 45.7 | 15900 | 42700 | 1.1 |
| 0.500 wt % excess | 4.77 | 2.69 | 45.6 | 15700 | 42200 | 1.5 |

EXAMPLE 10

Influence of cation stoichiometry upon electrical properties:

(a) Ca

The composition range examined was $0.690\ Ca_zTi_{1.03}O_3 + 0.310\ Nd_{0.95}Sm_{0.05}AlO_3 + 0.2$ wt % excess $CeO_2$, where z varied between 0.95 and 1.05.

TABLE 10(a)

| z Ca | Density/g cm$^{-3}$ | f/GHz | $\epsilon_r$ | Q | Qf/GHz | TCf/MK$^{-1}$ |
|---|---|---|---|---|---|---|
| 0.95 | 4.78 | 2.67 | 46.8 | 14000 | 37400 | 6.8 |
| 0.97 | 4.78 | 2.68 | 46.4 | 14500 | 38800 | 4.4 |
| 0.99 | 4.78 | 2.69 | 46.0 | 15100 | 40700 | 1.9 |
| 1.00 | 4.79 | 2.70 | 45.7 | 15300 | 41200 | 0.8 |
| 1.01 | 4.77 | 2.71 | 45.2 | 15600 | 42100 | −0.7 |
| 1.03 | 4.61 | 2.76 | 42.5 | 12600 | 34700 | −2.0 |
| 1.05 | 4.74 | 2.74 | 44.2 | 14700 | 40300 | −4.7 |

(b) Ti

The composition range examined was $0.690\ CaTi_zO_3 + 0.310\ Nd_{0.95}Sm_{0.05}AlO_3 + 0.2$ wt % excess $CeO_2$, where z varied between 0.98 and 1.08.

TABLE 10(b)

| z Ti | Density/g cm$^{-3}$ | f/GHz | $\epsilon_r$ | Q | Qf/GHz | TCf/MK$^{-1}$ |
|---|---|---|---|---|---|---|
| 0.98 | 4.76 | 2.78 | 43.0 | 14400 | 40000 | −9.7 |
| 1.00 | 4.69 | 2.78 | 42.9 | 12400 | 34300 | −5.3 |
| 1.02 | 4.78 | 2.72 | 45.1 | 15500 | 42200 | −1.5 |
| 1.03 | 4.79 | 2.70 | 45.7 | 15300 | 41200 | 0.8 |
| 1.04 | 4.78 | 2.70 | 46.2 | 15100 | 40600 | 2.9 |
| 1.06 | 4.78 | 2.66 | 47.0 | 14500 | 38400 | 7.6 |
| 1.08 | 4.79 | 2.64 | 48.0 | 13900 | 36500 | 12.2 |

(c) Al

The composition examined was $0.690\ CaTi_{1.03}O_3 + 0.310\ Nd_{0.95}Sm_{0.05}Al_zO_3 + 0.2$ wt % excess $CeO_2$, where z varied between 0.95 and 1.05.

TABLE 10(c)

| z Al | Density/g cm$^{-3}$ | f/GHz | $\epsilon_r$ | Q | Qf/GHz | TCf/MK$^{-1}$ |
|---|---|---|---|---|---|---|
| 0.95 | 4.46 | NR | — | — | — | — |
| 0.97 | 4.78 | 2.70 | 45.7 | 15400 | 41500 | 0.4 |
| 0.99 | 4.78 | 2.70 | 45.6 | 15600 | 41900 | 0.4 |
| 1.00 | 4.79 | 2.70 | 45.7 | 15300 | 41200 | 0.8 |
| 1.01 | 4.78 | 2.70 | 45.6 | 15400 | 41600 | 0.7 |
| 1.03 | 4.78 | 2.70 | 45.6 | 15400 | 41400 | 1.1 |
| 1.05 | 4.78 | 2.71 | 45.5 | 15100 | 40800 | 1.4 |

NR—no resonance detected

EXAMPLE 11

1 and 2 GHz parts:

Commercial size resonators were developed from the following composition:

$0.69CaTi_{1.03}O_3 + 0.31Nd_{0.95}Sm_{0.05}AlO_3 + 0.2$ wt % excess $CeO_2$.     Comp A The electrical response of ceramics prepared from the above composition A were evaluated against an undoped material of composition:

$0.69CaTi_{1.03}O_3 + 0.31NdAlO_3$     Comp B

The measured Q-values were as follows:

TABLE 11

| Freq/GHz | Comp A | Comp B | % Differential |
|---|---|---|---|
| 1.0 | 34600 | 33000 | 4.6 |
| 2.0 | 21000 | 20300 | 3.3 |
| 2.7 | 16000 | 15600 | 2.5 |

EXAMPLE 12

Dopant and influence on Q-value at elevated temperatures:

Composition: Comparison of Q-value at ambient and elevated temperature for compositions A and B ($0.69\ CaTi_{1.03}O_3 + 0.31\ Nd_{0.95}Sm_{0.05}AlO_3$)

TABLE 12

| Temperature/° C. | Q-value of Comp A | Q-value of Comp B |
|---|---|---|
| 22 | 16000 | 15600 |
| 80 | 13900 | 13500 |
| 120 | 12800 | 12400 |
| 150 | 12000 | 11600 |

Although the foregoing invention has been described in some detail for purposes of clarity of understanding, it will be apparent that certain changes and modifications may be practiced within the scope of the appended claims. It should be noted that there are many alternative ways of implementing the compositions of the present invention. Accordingly, the present embodiments are to be considered as illustrative and not restrictive, and the invention is not to be limited to the details given herein, but may be modified within the scope and equivalents of the appended claims.

The entire disclosures of all references cited herein are incorporated by reference for all purposes.

The invention claimed is:

1. A dielectric ceramic material consisting essentially of a composition of formula 1:

$$xATiO_3 + (1-x)Nd_zRe_{(1-z)}AlO_3 \qquad (1)$$

doped with about 0.005% to about 5% of a dopant selected from the group consisting of:
    $CeO_2$, $MnO_y$, and mixtures thereof;
    wherein A is selected from the group consisting of: Ca, Sr, Mg and mixtures thereof;
    Re is selected from a group consisting of La, Sm, Pr, Dy, Gd, Y, Er and mixtures thereof;
    wherein z is from 0.95 to 0.995;
    wherein x is a positive number less than 1 and $1 \leq y \leq 2$.

2. A dielectric ceramic material as claimed in claim 1 with a composition of formula 2:

$$xCa_dSr_{(1-d)}TiO_3 + (1-x)Nd_yRe_{(1-z)}AlO_3 \quad (2)$$

doped with about 0.005% to about 5% of a dopant selected from the group consisting of:
$CeO_2$, $MnO_y$, and mixtures thereof;
wherein $0.5 \leq x \leq 0.9$
$0.25 \leq d \leq 1.0$
$0.95 \leq z \leq 0.995$
$1 \leq y \leq 2$
Re is selected from a group consisting of La, Sm, Pr, Dy, Gd, Y, Er and
mixtures hereof and wherein
$CeO_2$ is added as a dopant in the range about 50 ppm to about 2.5 wt %.
$MnO_y$ is added as a dopant in the range about 50 ppm to about 2.5 wt %.

3. A dielectric ceramic material as claimed in claim 1 with a composition of formula 3:

$$xCaTi_{1.03}O_3 + (1-x)Nd_{0.95}Re_{0.05}AlO_3 \quad (3)$$

wherein $0.60 \leq x \leq 0.72$ and y are as stated above and Re is Sm or Pr and wherein
$CeO_2$ is added as a dopant in the range about 50 ppm to about 2.5 wt %, and
$MnO_y$ is added as a dopant in the range about 50 ppm to about 2.5 wt %.

4. A dielectric ceramic material as claimed in claim 3, wherein $0.65 \leq x \leq 0.72$, Re is Sm
and $CeO_2$ is added as an excess dopant in an amount of 0.2 wt %.

5. A dielectric ceramic material as claimed in claim 1 with a composition of formula 4:

$$xCaTi_{1.03}O_3 + (1-x)Nd_{0.05}Re_{0.95}AlO_3 \quad (4)$$

wherein $0.60 \leq x \leq 0.72$ and y are as stated above and Re is Sm or Pr and wherein
$CeO_2$ is added as a dopant in the range about 50 ppm to about 2.5 wt %, and
$MnO_y$ is added as a dopant in the range about 50 ppm to about 2.5 wt %.

6. A dielectric ceramic material as claimed in claim 5, wherein $0.60 \leq x \leq 0.72$, Re is Sm
and $CeO_2$ is added as an excess dopant in an amount of from 0.01 wt % to 1.0 wt %.

7. A dielectric ceramic material as claimed in claim 5, wherein $0.60 \leq x \leq 0.72$: Re is Pr
and $CeO_2$ is added as an excess dopant in an amount of from 0.01 wt % to 1.0 wt %.

8. A dielectric ceramic material as claimed in claim 3 wherein Sr, Mg or a mixture thereof are substituted for Ca in an amount of 0 to 20 mol % and wherein $0.85 \leq x \leq 1.0$.

9. A dielectric ceramic material as claimed in claim 1, further comprising an additional dopant in an amount of 20 to 5000 ppm, wherein the additional dopant is selected from the group consisting of: $Fe_2O_3$, $Nb_2O_5$, $Ta_2O_5$, $Ga_2O_3$ and mixtures thereof.

10. A dielectric ceramic material as claimed in any preceding claim 2, including further comprising an additional dopant in an amount of 20 to 5000 ppm, wherein the additional dopant is selected from the group consisting of: $Fe_2O_3$, $Nb_2O_5$, $Ta_2O_5$, $Ga_2O_3$ and mixture thereof.

11. A dielectric ceramic material as claimed in any preceding claim 3, including further comprising an additional dopant in an amount of 20 to 5000 ppm, wherein the additional dopant is selected from the group consisting of: $Fe_2O_3$, $Nb_2O_5$, $Ta_2O_5$, $Ga_2O_3$ and mixture thereof.

12. A dielectric ceramic material as claimed in claim 9, wherein the additional dopant is $Ga_2O_3$.

13. A dielectric ceramic material as claimed in claim 12, wherein the amount of $Ga_2O_3$ is from 20 to 2000 ppm.

14. A dielectric ceramic material as claimed in claim 3, wherein the cation site occupancy of Ca, Ti, Nd and Al is varied by ±10%.

15. A dielectric ceramic material as claimed in claim 1, wherein the material has electrical properties summarised as follows:

$\epsilon_r$ 42–48

Q (2 GHz)>10,000

TCf (variable through composition)–10 to +10 $MK^{-1}$.

16. A dielectric ceramic material as claimed in claim 1, wherein the material has electrical properties summarised as follows:

$\epsilon_r$ 42–48

Q (2.7 GHz)>14,000

TCf (variable through composition)–10 to +10 $MK^{-1}$.

17. A dielectric resonator comprising a dielectric ceramic material as claimed in claim 1.

18. A dielectric resonator as claimed in claim 17 with a composition of formula 2.

19. A dielectric resonator as claimed in claim 17 with a composition of formula 3.

20. A dialectic resonator as claimed in claim 17, wherein the dielectric ceramic material has electrical properties summarised as follows:

$\epsilon_r$ 42–48

Q (2 GHz)>10,000

TCf (variable through composition)–10 to +10 $MK^{-1}$.

* * * * *